M. S. NESBITT.
SEED DRIER.
APPLICATION FILED MAR. 10, 1921.

1,431,978.

Patented Oct. 17, 1922.

Inventor
M. S. Nesbitt
By R. M. McCracken,
his Attorney

Patented Oct. 17, 1922.

1,431,978

UNITED STATES PATENT OFFICE.

MILTON S. NESBITT, OF PAYETTE, IDAHO.

SEED DRIER.

Application filed March 10, 1921. Serial No. 451,214.

*To all whom it may concern:*

Be it known that I, MILTON S. NESBITT, resident of Payette, Payette County, State of Idaho, citizen of the United States, have invented certain new and useful Improvements in Seed Driers, of which the following is a specification.

My present invention relates to seed driers, and particularly to a device of this character intended for use in extracting water from seeds and grains which have been separated in accordance with the water method described in my copending application Serial No. 444,867, or which have through other circumstances been immersed in or saturated with water.

An object of this invention is to provide a machine taking advantage of centrifugal force to extract water from the seed and with which air is used to assist in the drying operation.

A further object is to so construct the parts that the machine can be continuously operated and a constant feed of the wet seed will be taken care of.

Yet another object resides in arranging a drying cylinder, in which the seed is held, to retain the seed as long as the same is wet and to discharge the seed when the water is removed therefrom.

With these and other objects in view which will be apparent from the drawings, specification and claims, this invention includes certain novel features of construction and combinations of parts which will now be set forth.

Figure 1:
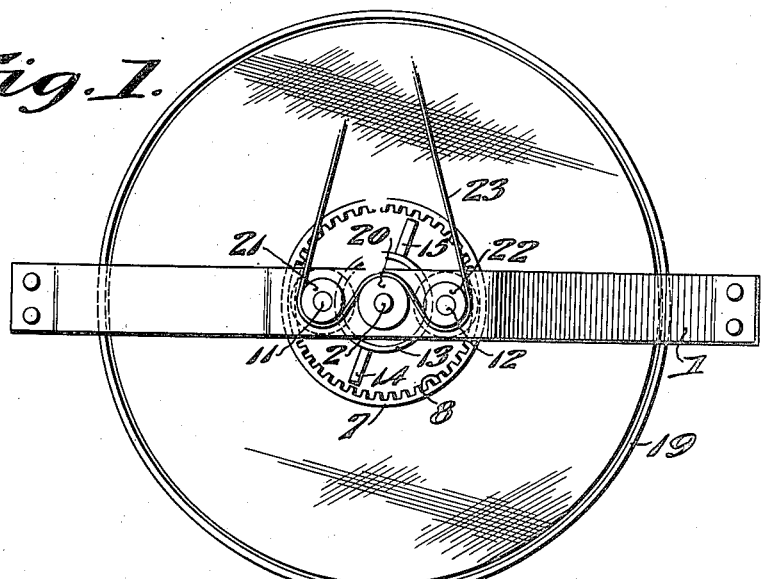
Figure 1 is a top plan view of a machine constructed in accordance with my invention.

A yoke-shaped frame 1 is provided with a bearing at its top and a shaft 2 is journaled vertically in the bearing of the frame and a step bearing 3 mounted on the supporting base for the machine.

A frusto-conical cylinder 4, of fine mesh wire screen and open at its top and bottom has spreader arms 5 connecting the bottom thereof with a bearing 6 which is revolubly received on the lower end of shaft 2 and supported by step bearing 3. At its upper end the cylinder 4 has a collar 7 secured, this collar having teeth cut on the inside as at 8. Spur gears 9 and 10 are mounted on shafts 11 and 12 having bearing in the top of the frame on opposite sides of the bearing for shaft 2, and these spur gears mesh with the teeth of collar 7 to hold the cylinder properly centered around shaft 2.

Figure 2:
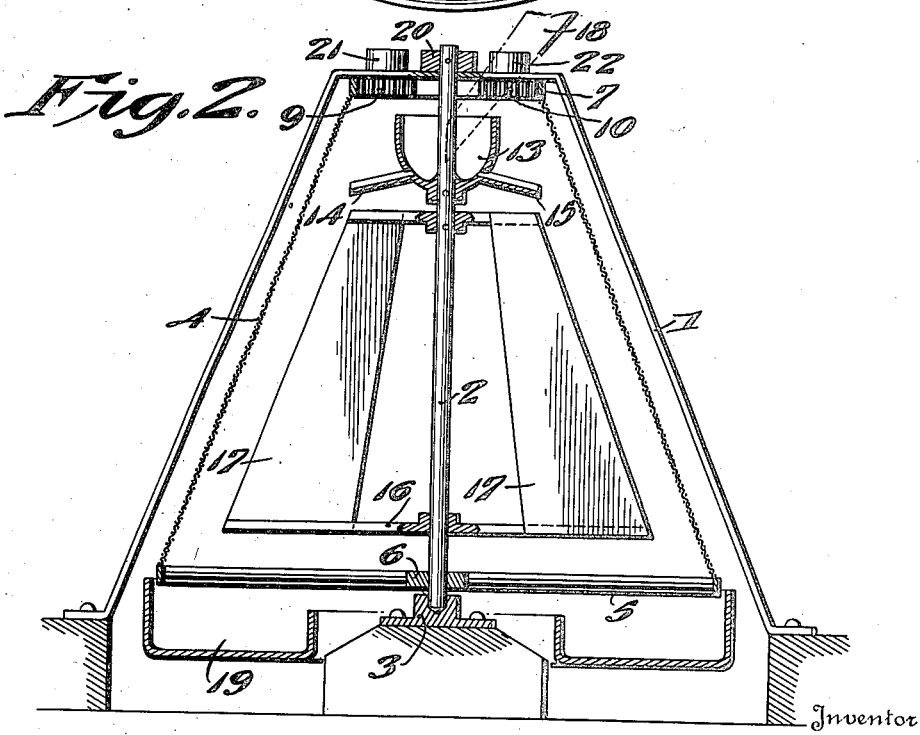
Fig. 2 is a vertical sectional view.

Adjacent the top end of the shaft a seed hopper 13 is fixed, the hopper being below the top of the cylinder and having discharge tubes or spouts 14 and 15 extending radially therefrom. This shaft 2 has the fan frames 16 fixed thereon below the hopper and fan blades 17 of which any number may be provided are mounted on the fan frames, these blades being preferably shaped substantially as shown in Fig. 2.

A spout 18 is extended through the open top of cylinder 4 to discharge into hopper 13, and the seed to be dried is supplied through this tube or spout in a wet state. A trough or receptacle 19 of annular form is provided beneath the lower edge of the cylinder.

It is intended that the cylinder 4 shall be rotated in one direction and shaft 2 carrying hopper 13 and fan blade 17 shall rotate in an opposite direction and preferably at a higher rate of speed, and to accomplish this purpose I provide belt pulleys 20, 21 and 22 on the shafts 2, 11 and 12, and arrange a belt 23 upon these belt pulleys as shown in Fig. 1. Power is supplied to this belt from any suitable source and the meshing of the spur gears with the teeth of the collar causes the cylinder 4 to be revolved in one direction while the shaft 2 turns at a higher rate of speed and in an opposite direction.

In the use of the machine power is applied to the belt and as the wet seed fed through spout 18 passes into hopper 13 it is discharged by centrifugal force through the tubes or spouts 14 and 15 and is precipitated against the inner screen wall of the cylinder. Centrifugal force will hold the seed upon the screen, but as the cylinder is tapered outwardly toward its bottom the seed rolls down the sloping wall and eventually drops from the lower edge into trough or receptacle 19 from which the dried seed can be collected. The spinning of the cylinder causes water to be extracted as the seed rolls down along the inner side of the screen wall, and this drying is aided by the passage of air currents through the screen from the fan structure. The force of the air from the fan will also insure that the seeds hold upon the cylinder until they are properly dried.

To aid in the drying operation heated air might be supplied, or the drier can be operated in a heated room or compartment to facilitate drying, however, as these points will be readily apparent to those skilled in the art they will not here be illustrated nor described in detail.

While, in the foregoing, I have described specific embodiments, and have mentioned only certain possible modifications, it will be appreciated that in practice I do not limit myself to such specific details as herein set forth, but may resort to any practical modifications falling within the scope of the invention as defined in the appended claims.

I claim:

1. A seed drier comprising a frusto-conical screen cylinder, means to support and revolve said cylinder on a vertical axis with its small end upwardly, and means to distribute wet seed upon the inner wall of the cylinder adjacent the top thereof.

2. A seed drier including with a vertically disposed revoluble shaft, a frusto-conical screen cylinder secured on said shaft with its small end upwardly, a hopper secured on the top of the shaft below the open top of the cylinder, and a spout by which wet seed is discharged into said hopper.

3. A seed drier including with a vertically disposed revoluble shaft, a frusto-conical screen cylinder secured on said shaft with its small end upwardly, a hopper secured on the top of the shaft below the open top of the cylinder, a spout by which wet seed is discharged into the hopper, and a fan mounted on the shaft within the cylinder to direct air toward and through the screen.

4. A seed drier including with a base having a shaft mounted thereon to revolve on a vertical axis, a frusto-conical screen cylinder open at both ends fixed on said shaft with the smaller end upwardly, a hopper fixed on the upper end of the shaft and disposed concentrically within and below the top of the cylinder, a spout from which wet seed is discharged into said hopper, a fan mounted on said shaft to discharge air against the inner wall of the cylinder, and a seed catching receptacle located beneath the open lower end of the cylinder.

5. A seed drier comprising a frusto-conical screen cylinder, means to support and revolve said cylinder on a vertical axis with its small end upwardly, a shaft revoluble centrally within the cylinder, a hopper provided with outlet spouts fixed on the upper end of said shaft below the top of the cylinder, and means by which said shaft is revolved in a direction opposite to the revolution of the cylinder.

6. A seed drier comprising a frusto-conical screen cylinder, means to support and revolve said cylinder on a vertical axis with its small end upwardly, a shaft revoluble centrally within the cylinder, a hopper provided with outlet spouts fixed on the upper end of said shaft below the top of the cylinder, means by which said shaft is revolved in a direction opposite to the revolution of the cylinder, and a fan structure fixed on the shaft below the hopper to direct air currents upon and through the screen wall of the cylinder.

7. A seed drier comprising a frusto-conical screen cylinder, means to support and revolve said cylinder on a vertical axis with its small end upwardly, a shaft revoluble centrally within the cylinder, a hopper provided with outlet spouts fixed on the upper end of said shaft below the top of the cylinder, means by which said shaft is revolved in a direction opposite to the revolution of the cylinder, a fan structure fixed on the shaft below the hopper to direct air currents upon and through the screen wall of the cylinder, a spout by which wet seed is fed to the hopper, and a trough to catch seed dropping from the lower edge of the cylinder.

In testimony whereof I hereunto affix my signature.

MILTON S. NESBITT.